Figure 1:
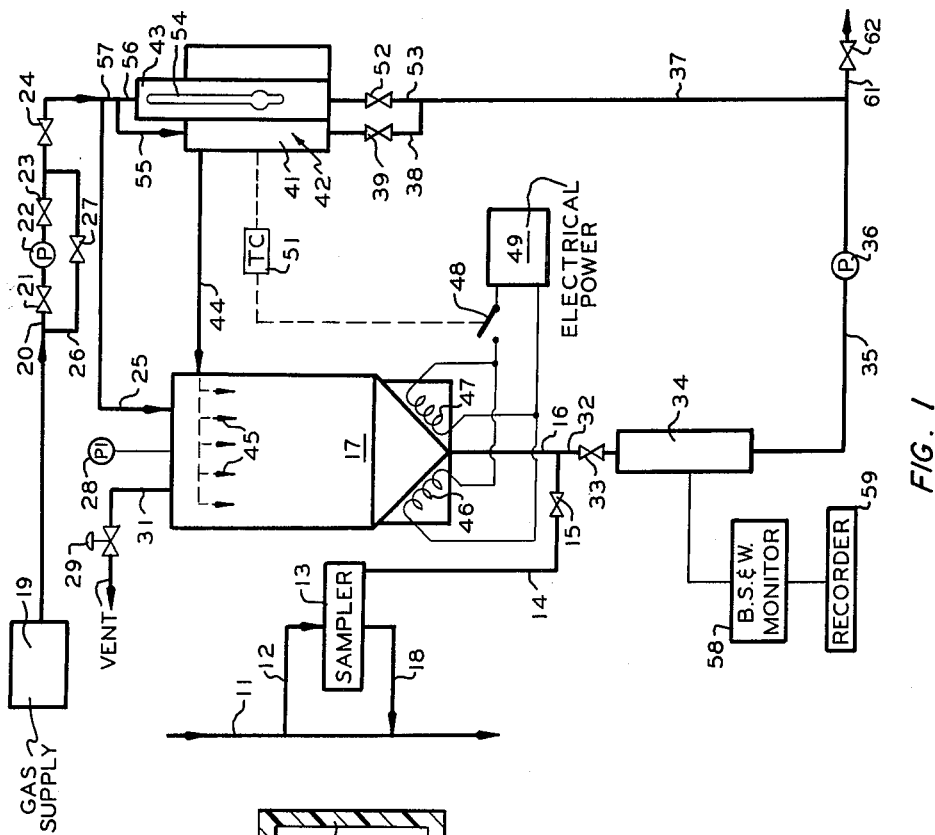

Dec. 14, 1965 L. E. KUNTZ ETAL 3,222,918
MEASUREMENT OF SPECIFIC GRAVITY AND BASIC
SEDIMENT AND WATER CONTENT OF OIL
Filed July 5, 1962 2 Sheets-Sheet 1

INVENTORS
L.E. KUNTZ
G.G. HEBARD

BY *Young + Quigg*

ATTORNEYS

INVENTORS
L.E. KUNTZ
G.G. HEBARD

BY Young + Quigg
ATTORNEYS

United States Patent Office 3,222,918
Patented Dec. 14, 1965

3,222,918
MEASUREMENT OF SPECIFIC GRAVITY AND BASIC SEDIMENT AND WATER CONTENT OF OIL
Louis E. Kuntz and Glen G. Hebard, Bartlesville, Okla., assignors to Phillips Petroleum Company, a corporation of Delaware
Filed July 5, 1962, Ser. No. 207,623
5 Claims. (Cl. 73—53)

This invention relates to method and apparatus for measuring the specific gravity and BS & W content of oil.

In custody transfer of crude oil from leases, conventional methods require a man to take a small "thief" sample, for example 50 cc., from each tank of crude oil to be transferred to the pipeline. The difficulties in obtaining a true representative sample by taking only 50 cc. from somewhere in a large tank holding, for example, 10,000 gallons of crude oil, which has been settling for a period of anywhere from a day to a month, is readily obvious. A slightly more advanced system provides for obtaining a composite sample ranging from about 1 to about 5 gallons over a period ranging from 3 to 30 days, followed by a man taking a small fraction, for example 50 cc., from the stored composite sample. Again the difficulties in obtaining a true representative sample from even a small volume as 1 gallon are apparent when consideration is given to the settling effect of the basic sediment and water (BS & W) due to storage. However, regardless of the manner of obtaining the 50 cc. sample, the next step is to place the 50 cc. in a graduated tube which is centrifuged to determine the BS & W content. The centrifuge tube can only be read accurately to 0.1%, and any error in these manual operations is multiplied by the total volume of fluid originally sampled and in most cases amounts to at least .05%. Gravity measurement in accordance with the conventional methods of custory transfer is made manually by draining the liquid from the sample container into an open hydrometer container. This results in flashing of light hydrocarbons to the atmosphere causing the API gravity reading to be lower than the true value. Inadvertent or intentional agitation of the sample also causes large specific gravity losses. For each degree of lowered specific gravity, the price for the crude oil is reduced 2 to 3 cents per barrel.

As crude as these procedures may seem, they are the basis on which payment is made for most crude oil transfers.

In accordance with the invention it has been discovered that the disadvantages of these procedures can be overcome by collecting a composite sample of crude oil from a flowing stream, storing the sample in a closed container under pressure, heating the stored sample to a predetermined temperature, determining the specific gravity of the thus heated sample, agitating the heated sample, and determining the BS & W content of the thus agitated sample by passing the agitated sample through a capacitance monitor. In a presently preferred embodiment of the invention, the specific gravity of the heated oil can be determined prior to the agitation step.

Accordingly it is an object of the invention to provide an improved apparatus for measuring the specific gravity and BS & W content of oil. Another object of the invention is to provide means for obtaining representative and accurate analyses of accumulated samples. Yet another object of the invention is to provide simple, inexpensive, and accurate equipment for measuring the quality of oil.

Other objects, aspects and advantages of the invention will be apparent from a study of the disclosure, the drawing and the appended claims to the invention.

Figure 3:
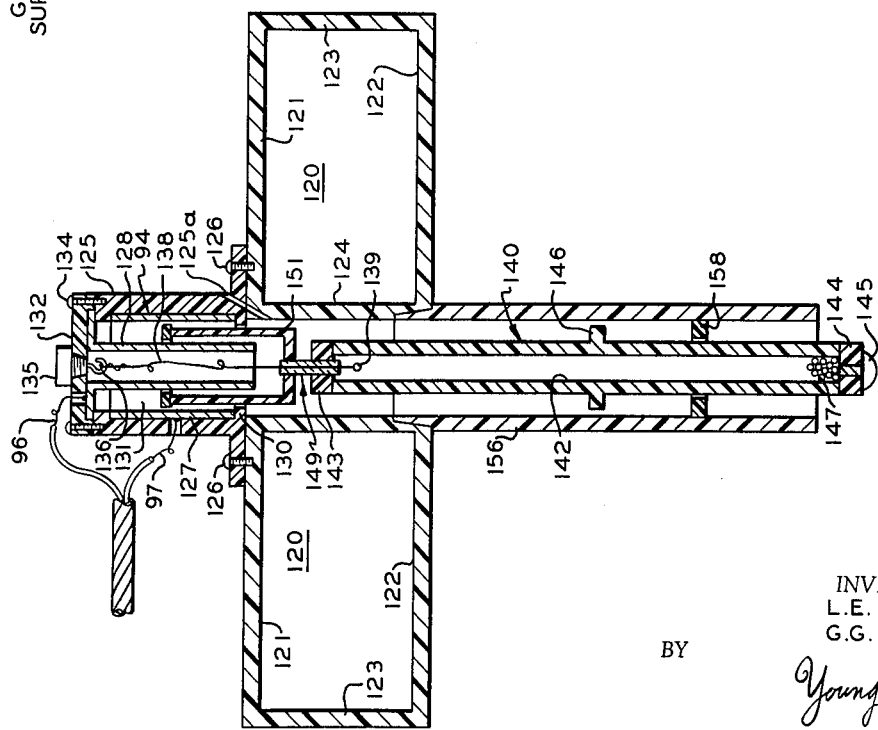
Figure 2:
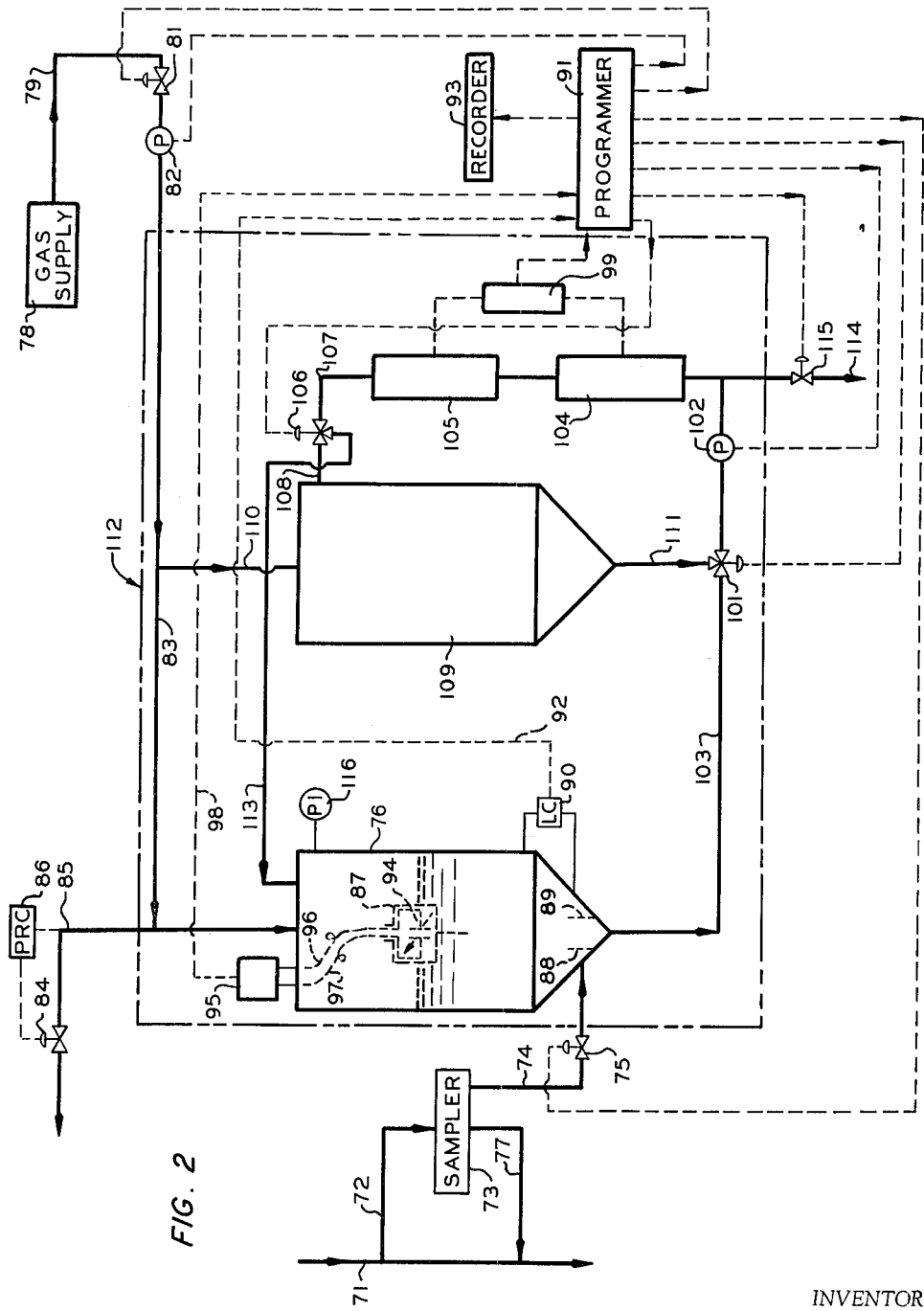

In the drawings FIGURE 1 is a schematic representation of a system for measuring specific gravity and BS & W content of oil in accordance with a first embodiment of the invention; FIGURE 2 is a schematic representation of a system for measuring specific gravity and BS & W content of oil in accordance with a second embodiment of the invention; and FIGURE 3 is a cross section of a preferred embodiment of the specific gravity to electrical signal transducer of the system of FIGURE 2.

Referring now to the drawings in detail, and to FIGURE 1 in particular, a stream of crude oil is withdrawn from pipeline 11 and passed through conduit 12 into sampler 13 wherein a sample is obtained continuously or at frequent intervals and passed through conduit 14, valve 15 and conduit 16 into sample container 17. The remainder of the oil stream can be returned to pipeline 11 by way of conduit 18. Sampler 13 can be any suitable device, such as a McFarland proportional sampler, manufactured by McFarland Engineering and Pump Company, Houston, Texas.

Prior to the accumulation of a composite sample, sample container 17 is filled with a suitable gas under a predetermined pressure. This can be accomplished by transferring gas from gas supply 19 by way of conduit 20, valve 21, pump 22, valves 23 and 24 and conduit 25 into sample container 17. If the gas pressure in gas supply 19 is higher than that desired in sample container 17, valves 21 and 23 can be closed and the gas transferred from gas supply 19 to sample container 17 by way of conduit 26, throttling valve 27, valve 24 and conduit 25. A pressure indicator 28 can be mounted on sample container 17 to provide a visual indication of the gas pressure therein and to permit the manual actuation of pump 22 and valve 24 for the purpose of transferring gas from gas supply 19 into sample container 17 until the predetermined desired pressure in sample container 17 is obtained. The pressure in sample container 17 is maintained substantially constant by the utilization of a pressure regulating valve 29 located in vent conduit 31. Valve 29 can be self-actuated, manually actuated or actuated by a pressure controller responsive to the pressure in sample container 17, as desired. Gas supply 19 can be any suitable source, such as the vapor space of the crude oil storage tank or a supply of air or an inert gas such as nitrogen.

The sample is accumulated in container 17 until such time as it is desired to take specific gravity and BS & W readings on the sample. When a readout is desired, valve 15 is turned to a closed position and the oil is withdrawn from container 17 and passed by way of conduits 16 and 32 and valve 33 into and through capacitance measuring cell 34 as the dielectric material therefor. The oil leaving capacitance measuring cell 34 is passed by way of conduit 35, pump 36, conduits 37 and 38 and valve 39 into the outer chamber 41 of gravitometer 42. The oil in chamber 41 passes in heat exchanging relationship with inner chamber 43 and is then withdrawn by way of conduit 44 and introduced into the upper portion of chamber 17 by means of a plurality of sprays 45. Heat is applied to the lower portion of sample container 17 by a suitable means, such as electrical heating elements 46 and 47 which are connected through switch 48 to electrical power source 49. Switch 48 is actuated by a temperature controller 51 responsive to the temperature of the oil in chamber 41 such that heat is applied to the oil in sample container 17 until the oil in chamber 41 reaches a predetermined desired temperature, and thereafter heat is applied to the oil in sample container 17 only in a sufficient amount to maintain the predetermined desired temperature. When the oil in chamber 41 has achieved the predetermined desired temperature, valve 52 in conduit 53 is opened momentarily to admit a sample of oil from line 37 into inner chamber 43. The size of the sample is such as to cause hydrometer 54, which is contained in chamber 43, to be visible through the transparent walls of the upper portion of chamber 43, but small enough to remain within that portion of chamber 43 which is in heat transferring relationship with chamber 41. Both chambers 41 and 43 are maintained under the same gas pressure as container 17 by means of conduits 55 and 56 which communicate with conduit 25 by way of conduit 57. When the temperature of the oil in chamber 41 reaches the predetermined desired level, the output of capacitance measuring cell 34 is applied to BS & W monitor 58, the output of which can be recorded by recorder 59.

Upon the completion of the readout the oil is removed from the sampling system by way of conduit 61 and valve 62 and can be passed to a surge tank, to disposal, or be reintroduced into pipeline 11. During or after the withdrawal of the sample oil from the sampling system, gas is transferred from gas supply 19 into container 17 and chambers 41 and 43 to return the pressure in the sampling system to the predetermined value.

Thus it is readily obvious that the system of FIGURE 1 provides means whereby the specific gravity and BS & W content of the entire composite sample are obtained under conditions conductive for the most accurate determination thereof, that is, constant temperature, thoroughly admixed sample, and a closed system under pressure to prevent loss of sample by flashing.

Referring now to FIGURE 2 a stream of crude oil is withdrawn from pipeline 71 and passed through conduit 72 into sampler 73 wherein a sample is obtained continuously or at frequent intervals and passed through conduit 74 and valve 75 into sample container 76. The remainder of the oil stream can be returned to pipeline 71 by way of conduit 77. Sampler 73 can be any suitable device, such as a McFarland proportional sampler.

Prior to the accumulation of a composite sample, sample container 76 is filled with a suitable gas under a predetermined pressure. This can be accomplished by transferring gas from gas supply 78 by way of conduit 79, valve 81, pump 82 and conduit 83 into sample container 76. The pressure in sample container 76 is maintained substantially constant by the utilization of a pressure regulating valve 84 in vent conduit 85. Valve 84 can be self-actuated, manually actuated or actuated by pressure controller 86 responsive to the pressure in sample container 76, as desired. Gas supply 78 can be any suitable source, such as the vapor space of the crude oil storage tank or a supply of air or an inert gas such as nitrogen. The sample is accumulated in container 76 until such time as it is desired to take specific gravity and BS & W readings on the sample. A specific gravity determination of the settled sample contained in sample container 76 can be made at any time that the level of the sample is sufficiently high to float specific gravity probe element 87 off stops 88 and 89. Liquid level indicator 90 can be utilized to provide a visual indication of the liquid level in container 76 or, in the case of an automatic system, can be connected to programmer 91 by means of line 92, to gate programmer 91 to pass the output of specific gravity probe element 87 to recorder 93. Specific gravity probe element 87 contains a variable capacitor 94, the capacitance of which varies as a function of the specific gravity of the sample in container 76. Capacitor 94 is connected by coaxial leads 96 and 97 in one arm of an impedance bridge comprising the input circuit to a capacitance measuring instrument which serves as specific gravity monitor 95. The output of specific gravity monitor 95 is transmitted to programmer 91 by means of line 98.

When it is desired to obtain a BS & W reading of the sample, three-way valve 101 and pump 102 are actuated to withdraw the sample from container 76 by way of conduit 103 and to pass the thus withdrawn sample into and through capacitance measuring cells 104 and 105 as the dielectric material therefor. Three-way valve 106 is actuated to pass the oil leaving capacitance measuring cell 105 by way of conduits 107 and 108 into container 109. Container 109 is maintained under the same predetermined pressure as container 76 by means of conduit 110 which communicates with conduit 83. When all of the sample has been transferred from container 76 into container 109, three-way valve 101 is actuated to close conduit 103, and the oil contained in container 109 is withdrawn by way of conduit 111 and recycled by pump 102 through capacitance measuring cells 104 and 105 and valve 106 into container 109. Capacitance measuring cells 104 and 105 are connected to first and second inputs of BS & W monitor 99. The cycling of the oil is continued until the oil and the BS & W have become thoroughly admixed. In manual operations this can be determined by observing the visual output of BS & W monitor 99 until the output reaches a steady state condition, at which time the output of the BS & W monitor 99 can be recorded. In automatic operation the cycling of the oil can be maintained for a predetermined time of sufficient length to insure thorough admixing of the oil and BS & W, and programmer 91 can be utilized to gate the output of BS & W monitor 99 to recorder 93 at the expiration of this predetermined time.

The specific gravity measurement and BS & W content measurement are made at a predetermined temperature by means of insulated cabinet 112, the temperature inside of which is thermostatically controlled, and which encloses containers 76 and 109 and capacitance measuring cells 104 and 105 as well as the associated piping system.

When it is desired to determine the specific gravity of the mixed sample of oil and BS & W, the oil is allowed to circulate through container 109 until it is thoroughly admixed, at which time three-way valve 106 is actuated to pass the mixed sample from conduit 107 through conduit 113 into container 76 while three-way valve 101 maintains conduit 103 closed. Again when the liquid level of the sample in container 76 rises sufficiently to float specific gravity probe element 87, a reading of specific gravity can be taken, either automatically or manually.

At the conclusion of the testing of the sample, the sample can be withdrawn from the sampling system by actuating three-way valve 101 to withdraw the oil from container 76 or 109, as the case may be, by means of pump 102, and passed through conduit 114 which contains a valve 115 which also has been actuated to an open position. In manual operation the pumps and valves can be actuated manually and the output of specific gravity monitor 95 and BS & W monitor 99 can be connected to visual output means so that the specific gravity and BS & W content can be visually observed. A pressure indicator 116 can be provided as a means of determining the pressure within container 76 and 109. In automatic operation programmer 91, which can be any suitable device such as cam actuated programmer, an electro-mechanical programmer or an electronic programmer, examples of all of which are known in the art, can be utilized to actuate the valves and pumps and to effect the recording of the specific gravity and BS & W content. Capacitance measuring cell 105 can be utilized in both manual and automatic operation to permit the desired temperature within housing 112 to be varied while maintaining the accuracy of capacitance measuring cell 104. As desired a temperature compensating capacitance cell can be connected in the impedance bridge circuit of specific gravity monitor 95 in association with capacitor 94 to provide for temperature compensation of capacitor 94. The output of specific gravity monitor 95 when specific gravity probe element 87 is on stops 88 and 89 can be utilized as a zero specific gravity reference point, and the output of the BS & W monitor 99 when a fixed capacitor is switched into the measuring circuit in place of cell 104 can be utilized as a zero BS & W reference value, each of which can be subtracted from the respective specific gravity and BS & W readings for the sample to eliminate the effects of electronic and thermal drift.

Thus it is readily obvious that the system of FIGURE 2 provides means for determining the specific gravity of the entire undisturbed composite sample as well as the specific gravity and BS & W content of the thoroughly admixed sample. Again the readings are obtained under conditions which are conducive for the most accurate determination thereof, that is, constant temperature, a closed system under pressure to prevent loss of sample by flashing, and a thoroughly admixed sample in the case of the measurement of BS & W and specific gravity of the mixed sample, and the undisturbed sample for the measurement of the specific gravity of an undisturbed sample.

The predetermined pressure at which the gas in the systems of FIGURES 1 and 2 is maintained can be any suitable value which is sufficiently high to prevent breakout of the light ends, such as a value higher than the vapor pressure of the fluid being sampled, and is generally in the range of about 5 to about 20 p.s.i.g. The temperature at which the oil samples are maintained can be any suitable temperature which is sufficiently high to prevent the system from being affected by variation in the temperature of the surrounding atmosphere. In the system of FIGURE 2 the temperature can be maintained sufficiently high to cause the water and sediment to settle out where a specific gravity reading of the oil alone is desired. Generally the temperature is maintained in the range of about 100 to about 150° F. The entire sampling cycle can be initiated on a time sequence, such as every 24 hours, once a week, etc., and would start only on the concurrence of the "timing signal" and an indication by liquid level 90 that sufficient fluid has accumulated for a read out.

A preferred embodiment of the specific gravity to electrical signal transducer 87 is shown in FIGURE 3. It comprises a main float 120 having a top 121, a bottom 122, a side wall 123, and an inner wall 124. The respective portions of 120 can preferably be made of polymethylmethacrylate, examples of which are Plexiglas and Lucite, and are secured together either by glue, screws, or other suitable fastening means. They and the other parts are preferably of circular cross-section for ease of manufacture. Where screwed fasteners are used, the respective wall must be sufficiently thick to accommodate the tapped hole without leaking either through the wall or through the hole.

Secured to the top 121 of the main float is an electrode-supporting cap 125. This cap may be manufactured to be integral with the top 121 or it can be manufactured separately as shown and secured thereto as by a plurality of screwed fasteners 126. A vent passage 125a is drilled through the cap 125 to the interior of the float 120. The cap 125 is cupshaped having a hole in the top thereof in order to support the electrode 128 that comprises part of the capacitance unit 94. Electrode 128 has a flange at its upper end for support purposes. The second electrode or plate 127 of the unit 94 is held against the inner circumference of the cup, so that it surrounds the electrode 128, by an upper guide ring 130 that also serves to guide the hydrometer float, described below. This guide ring 130 is press fitted into the cup 125. The two electrodes 127 and 128 should be made of stainless steel or some similar electrically conducting and substantially non-corrodible material. A chamber 131 is defined by the annular space between the two electrodes 127 and 128. An impedance-changing member moves within this space to change the balance of the bridge in specific gravity monitor 95.

The cap 125 is sealed at its upper end by a sealing member 132. Screws 134 secure the member 132 to cap 125. The member 132 also operates to hold the electrode 128 down against the cap 125 by engaging the flange on electrode 128. A threaded passage provided through the uppermost portion of the member 132 receives a bushing 135 having a hook 136 in the bottom thereof. A string 138 is tied to the hook and depends therefrom down to connect by means of knot 139 to the hydrometer float assembly 140. String 138 is long enough to permit full motion of the hydrometer float relative to the main float. The knot prevents string 138 from pulling loose from the hydrometer float. Electrical leads 96 and 97 are connected to their respective electrodes through appropriate holes in the cap 125 and the member 132. These electrode connections are preferably soldered. However, screwed terminals may also be used.

The hydrometer float assembly 140 is principally constructed from a length of polymethylmethacrylate (e.g. Lucite) tubing 142. The ends of the tubing are sealed by gluing bushings 143 and 144 thereto. A hydrometer float stop 146 is secured to the tubing 142 as by glue or a set screw passing through 146 and partly through 142. The hydrometer float is weighted by a plurality of lead shot 147 to remain upright when placed in a body of liquid. The shot 147 is introduced through bushing 144 by removal of the screw 145 which is threaded into 144. When lead shot is added to or removed from the hydrometer float, it increases or decreases, respectively, the sensitivity of the hydrometer as a whole: the amount the hydrometer float moves for a given specific gravity change, respectively, increases or decreases.

A member 149 secures a Teflon cup 151 to the bushing 143. This cup 151 is of such a size and shape that it fits into the chamber 131 and can move up and down therein. The material of which cup 151 is made could be other than Teflon, but should be a material having a very low dielectric constant that is inert to the liquids and vapors to which it may be exposed. The dielectric constant should be stable with respect to temperature, i.e., should remain substantially constant over the range of temperatures expected for a given application. The purpose of this assembly is so that when the specific gravity of the liquid changes, the hydrometer float moves up and down with respect to the main float and thereby moves the cup 151, to thereby displace air or gas (with a dielectric constant of approximately 1) with Teflon (dielectric constant of approximately 2). This two-to-one change in dielectric constant results in an impedance change in the bridge network of gravity monitor 95. When the cup 151, also termed an impedance-changing member, moves up and down in the chamber 131, it thus changes the impedance of the branch of the electrical bridge in gravity monitor 95, thus to produce an electrical signal which is representative of the specific gravity of the liquid. Member 151 has a flange at the upper end thereof to maintain its spacing from the plates of the impedance assembly 94.

A means for guiding the hydrometer float so that the impedance-changing member 151 is restrained to move up and down in the chamber 131 is provided by a larger piece of tubing 156 which is secured to the main float, and depends therefrom. The upper end of this member is shaped so that it slips into a corresponding opening in the main float 120. It is secured to the main float preferably by gluing at the upper end. Epoxy resin glue is suitable for this purpose. A lower guide ring 158 is secured to the member 156 at a position such that it will be lower than the guide ring 146 on the hydrometer float. The guide ring 158 is disposed in this fashion because the opening therethrough is of lesser diameter than is the outside diameter of the guide ring 146, and thus serves to retain the hydrometer float inside the assembly. This permits lifting the entire assembly 87 out of the liquid in which it is floating without losing the hydrometer float. Also, it provides a lower limit for the motion of the hydrometer float. The means for guiding 156 can be milled or cut out so that it has a generally open structure and thus permits free flow of the fluid into contact with the hydrometer float.

The apparatus and method disclosed herein can be utilized to eliminate the human element from the quality measurements which directly affect volume and price of crude oil involved in a transfer.

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor; likewise, the omission of an element which one skilled in the art may include in an actual unit does not mean that such a piece of equipment is intended to be omitted simply because it does not appear in the drawing.

Suffice to say, the drawing is for illustrative purposes, as is the description thereof.

Reasonable variation and modification are possible within the scope of the disclosure, the drawings and the appended claims to the invention.

We claim:

1. Apparatus for determining the quality of oil passing through a pipeline comprising means for withdrawing a stream of oil from said pipeline, means for taking samples from said stream, means for reintroducing the remainder of said stream into said pipeline, a first container, means for introducing into said first container the samples from said means for taking, means for maintaining the temperature of the oil in said first container substantially constant at a predetermined value, a capacitance measuring cell, means for withdrawing oil from said first container and passing the thus withdrawn oil into and through said capacitance measuring cell as the dielectric material therefor, means responsive to the output of said capacitance measuring cell for producing a signal representative of the basic sediment and water content of the oil passing through said capacitance measuring cell, a second container, means for passing the oil from said capacitance measuring cell into said second container, means in said second container for indicating the specific gravity of the oil in said second container, and means for introducing a gas into said first and second containers under pressure, and means for maintaining the pressure of the gas in said first and second containers substantially constant at a predetermined value.

2. Apparatus for determining the quality of oil comprising means for obtaining samples of the oil, a first container, means for introducing said samples into said first container, means adapted to heat the oil contained in said first container to maintain the temperature of said oil contained in said first container substantially constant at a predetermined value, a capacitance measuring cell, a second container having an inner chamber and an outer chamber, means for passing oil from said first container into and through said capacitance measuring cell as the dielectric material therefor and into and through said outer chamber of said second container, said outer chamber being in heat exchanging relationship with said inner chamber, means for introducing a portion of the oil from said first container into said inner chamber of said second container, means located in said inner chamber of said second container for indicating the specific gravity of the oil contained in said inner chamber, means for maintaining the pressure in said first container and said inner and outer chambers of said second container substantially constant at a predetermined value, and means responsive to the output of said capacitance measuring cell for producing a signal representative of the basic sediment and water content of the oil passing through said capacitance measuring cell.

3. Apparatus for determining the quality of oil passing through a pipeline comprising means for obtaining samples of the oil passing through said pipeline, a first container, means for introducing said samples into said first container, means for heating the oil contained in said first container to maintain the temperature of said oil contained in said first container substantially constant at a predetermined value, a capacitance measuring cell, a second container having an inner chamber and an outer chamber, means for passing oil from said first container into and through said capacitance measuring cell as the dielectric material therefor and into said outer chamber of said second container, said outer chamber being in heat exchanging relationship with a lower portion of said inner chamber, the upper portion of said inner chamber extending above said outer chamber, and at least a portion of the wall of the upper portion of said inner chamber being transparent, means for withdrawing oil from said outer chamber of said second container and reintroducing the thus withdrawn oil into said first container, means for introducing into said inner chamber of said second container a portion of the oil from said first container, a hydrometer located in said inner chamber of said second container for indicating the specific gravity of the oil contained in said inner chamber, means for introducing a gas into said first container and into the inner and outer chambers of said second container, means for maintaining the pressure of the gas in said first container and in said inner and outer chambers of said second container substantially constant at a predetermined value and means responsive to the output of said capacitance measuring cell for producing a signal representative of the basic sediment and water content of the oil passing through said capacitance measuring cell.

4. Apparatus for determining the quality of oil comprising means for obtaining samples of the oil, a first container, means for introducing said samples into said first container, means for introducing a gas into said first container, means for maintaining the pressure of the gas in said first container substantially constant at a predetermined value, means located in said first container for establishing a signal representative of the specific gravity of the oil in said first container, a capacitance measuring cell, means for withdrawing oil from said first container and passing the thus withdrawn oil into and through said capacitance measuring cell as the dielectric material therefor, means for maintaining the temperature of the oil in said first container and the temperature of the oil passing through said capacitance measuring cell substantially constant at a predetermined value, and means responsive to the output of said capacitance measuring cell to produce a signal representative of the basic sediment and water content of the oil passing through said capacitance measuring cell.

5. Apparatus for determining the quality of oil passing through a pipeline comprising, means for obtaining samples of the oil passing through said pipeline, a first container, means for introducing said samples into said first container, a capacitor located in said first container, the capacitance of said capacitor varying as a function of the specific gravity of the oil contained within said first container, means responsive to the variations in capacitance of said capacitor to establish a signal representative of the specific gravity of the oil contained in said first container, a second container, means for transferring the oil from said first container to said second container, a capacitance measuring cell, means for passing the oil from said second container into and through said capacitance measuring cell as the dielectric material therefor, fluid transferring means, said fluid transferring means being adapted in a first position to transfer the oil from said capacitance measuring cell into said first container and being adapted in a second position to transfer the oil from said capacitance measuring cell into said second container, means for introducing a gas into said first and second containers, means for maintaining the gas pressure in said first and second containers substantially constantly constant at a predetermined value, means for maintaining the temperature of the oil in said first and second containers substantially constant, and means responsive to the output of said capacitance measuring cell to establish a signal representative of the basic sediment and water content of the oil passing through said capacitance measuring cell.

References Cited by the Examiner

UNITED STATES PATENTS

| | | | |
|---|---|---|---|
| 2,362,661 | 11/1944 | Peters et al. | 73—453 X |
| 3,005,554 | 10/1961 | Kuntz | 324—61 X |
| 3,074,277 | 1/1963 | Hill | 73—53 X |

RICHARD C. QUEISSER, *Primary Examiner.*

DAVID SCHONBERG, *Examiner.*